(12) United States Patent
Tritchkov

(10) Patent No.: US 12,411,722 B2
(45) Date of Patent: Sep. 9, 2025

(54) METHOD FOR DATA COMMUNICATION BETWEEN A MANAGEMENT LEVEL AND A FIELD LEVEL OF AN INDUSTRIAL SYSTEM

(71) Applicant: Siemens Aktiengesellschaft, Munich (DE)

(72) Inventor: Ivan Tritchkov, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 247 days.

(21) Appl. No.: 17/510,428

(22) Filed: Oct. 26, 2021

(65) Prior Publication Data
US 2022/0129344 A1 Apr. 28, 2022

(30) Foreign Application Priority Data
Oct. 28, 2020 (EP) ...................................... 20204334

(51) Int. Cl.
*G06F 11/00* (2006.01)
*G06F 11/07* (2006.01)
*H04L 67/12* (2022.01)

(52) U.S. Cl.
CPC ...... *G06F 11/0772* (2013.01); *G06F 11/0736* (2013.01); *G06F 11/0751* (2013.01); *H04L 67/12* (2013.01)

(58) Field of Classification Search
CPC ............. G06F 11/0703; G06F 11/0706; G06F 11/0736; G06F 11/0739; G06F 11/0742; G06F 11/0751; G06F 11/0754; G06F 11/0766; G06F 11/0769; G06F 11/0772; G06F 11/0775; G06F 11/0784; G06F 11/0793; H04L 67/01; H04L 67/12; H04L 67/125
See application file for complete search history.

(56) References Cited

U.S. PATENT DOCUMENTS

| | | | |
|---|---|---|---|
| 10,270,853 B2 * | 4/2019 | Toepke | G05B 19/042 |
| 10,649,449 B2 * | 5/2020 | Bell | G05B 23/024 |
| 11,537,094 B2 * | 12/2022 | Torio | G05B 19/0426 |
| 11,609,542 B2 * | 3/2023 | Jundt | G05B 19/0423 |
| 2011/0302351 A1 | 12/2011 | Aybay et al. | |

(Continued)

FOREIGN PATENT DOCUMENTS

EP 2801935 A1 11/2014

*Primary Examiner* — Philip Guyton
(74) *Attorney, Agent, or Firm* — Schmeiser, Olsen & Watts, LLP

(57) ABSTRACT

Provided is a method for data communication between a management level and a field level of an industrial system, including: a data communication module receiving a data query from a management level application on the management level to a field device on the field level; the data communication module transferring the data query from the management level application to the field device; the data communication module receiving response data from the field device to the data query; a checking module of the data communication module checking a data quality of the response data; and if an insufficient data quality is ascertained in the check, the checking module performing a corrective measure in order to correct the defective response data.

20 Claims, 5 Drawing Sheets

(56) References Cited

U.S. PATENT DOCUMENTS

| | | | |
|---|---|---|---|
| 2014/0122806 A1* | 5/2014 | Lin | H04L 67/12 |
| | | | 711/126 |
| 2015/0077263 A1* | 3/2015 | Ali | G05B 23/0216 |
| | | | 340/679 |
| 2016/0178414 A1* | 6/2016 | Saha | G05B 23/0216 |
| | | | 702/188 |
| 2018/0356792 A1* | 12/2018 | Chao | G06F 16/907 |
| 2020/0090424 A1* | 3/2020 | Honda | G08C 15/00 |
| 2022/0078267 A1* | 3/2022 | Nixon | G05B 19/0423 |

* cited by examiner

METHOD FOR DATA COMMUNICATION BETWEEN A MANAGEMENT LEVEL AND A FIELD LEVEL OF AN INDUSTRIAL SYSTEM

CROSS-REFERENCE TO RELATED APPLICATIONS

This application claims priority to European Application No. 20204334.5, having a filing date of Oct. 28, 2020, the entire contents of which are hereby incorporated by reference.

FIELD OF TECHNOLOGY

The following relates to a method for data communication between a management level and a field level of an industrial system.

BACKGROUND

Industry 4.0 is a term that describes the ongoing fourth industrial revolution and the trend for digitization in the fields of industry. The key concepts behind Industry 4.0 are the intelligent networking of industrial machines and devices and the use of new technologies such as cyber-physical systems (CPS), the Industrial Internet of Things (IIoT), cloud computing, cognitive computing and artificial intelligence in manufacture. The combination of interlinked industrial devices and the use of the most cutting-edge digitization technologies make it possible not only to optimize manufacturing processes, to increase productivity and to get the best out of the production process, but also open up a whole new world of business opportunities. Many companies across the world are therefore in the midst of a digital transformation that comprises the process of adopting data and digital solutions for all activities across the entire business life cycle.

One of the largest obstacles in the way of achieving the advantages promised by Industry 4.0 is the quality of the data that are produced and processed by industrial devices. Modern industrial applications for example, but also established manufacturing systems from what is known as the "office floor", aim to use AI-based or data analysis-based methods to predict maintenance or even failures, but also to monitor the current production state. For this purpose, they learn from the past and are based on real operating data that are gathered or sent directly from prosumers. A prosumer is in this case a system component or a hardware device that both produces and consumes data. Examples of prosumers are field devices, for example CNC machines, milling and drilling machines, industrial robots, or sensors and actuators in other industrial devices such as vehicles or medical devices.

The data gathered from the prosumers generally go through a whole series of data aggregation steps in the data layer of the industrial system, wherein the data layer constitutes a connection between the field level in which the field devices are arranged and a management level in which, in addition to controlling processes of the industrial system, management-based decisions with regard to the orientation of the business may also be taken. This is for two reasons: i) the large amounts of data are aggregated to form smaller datasets that are easier to handle, and ii) the data are prepared (that is to say formatted and packaged) for use by the application layer. This is a highly important step, since defective data that are delivered by the devices may distort the monitored state of the device or of the production process. Data analysis methods, AI algorithms or even simple display techniques such as dashboarding would thus deliver results that do not correspond to reality.

SUMMARY

An aspect relates to an improved method for data communication between applications on a management level and field devices of automation systems, this method enabling increased data quality.

According to one aspect of embodiments of the invention, what is provided is a method for data communication between a management level and a field level of an industrial system, wherein the method comprises:

a data communication module receiving a data query from a management level application on the management level to a field device on the field level;

the data communication module transferring the data query from the management level application to the field device;

the data communication module receiving response data from the field device to the data query; a checking module of the data communication module checking a data quality of the response data; and if an insufficient data quality is ascertained in the check, the checking module performing a corrective measure in order to correct the defective response data.

This makes it possible to achieve the technical advantage whereby it is possible to provide a method for data communication between a management level and a field level of an industrial system that is able to guarantee improved data communication, since it is possible to detect and correct data from field devices on the field level. This may in particular be performed in the course of a data query by elements on the management level in the form of a data query. This makes it possible to avoid data of insufficient data quality being forwarded from elements on the field level, in particular field devices, to the elements on the management level in the course of the data query.

The method according to embodiments of the invention thus makes it possible, in the course of a data query, in the form of a data query, by management level applications on a management level of an industrial system to field devices on a field level, to perform a quality check on the response data from the field devices provided in response to the data query and possibly to correct defective response data.

An industrial system in the sense of the patent application is a business operating complex having at least a field level in which industrial processes are performed by way of corresponding field devices, a data level or control level in which the industrial processes are controlled based on measured data or control data from the field devices on the field level, and a management level in which business processes and economic orientations of the industrial system are decided. An industrial system may in particular be formed by an automation system. As an alternative, an industrial system may be formed by an industrial production installation or by an industrial company having a multiplicity of different industrial production installations.

The method according to embodiments of the invention may be performed during the runtime or during the operation of the industrial system. The checking of the data quality of the response data from the corresponding field devices as queried by the management level application and the performance of appropriate corrective measures in accordance with the method according to embodiments of the invention may in particular be performed at runtime of the industrial system and thus during operation of the individual field devices. By way of example, the response data transmitted by the field devices for each data query transmitted by the management level application during the operation of the industrial system to the corresponding field devices may be checked for data quality and possibly corrected in accordance with the corrective measures. As an alternative, the data quality may be checked and appropriate corrections may be made on a random basis, such that only the response data of a predetermined percentage of transmitted data queries are investigated for data quality in accordance with the method according to embodiments of the invention. As an alternative, the data quality of the response data may be checked and appropriate corrections may be made only during breaks in operation, for example during maintenance work on the industrial system or parts of the system.

A management level in the sense of the patent application may comprise a process management level, an operational management level and a business level in accordance with the automation pyramid.

A management level application in the sense of the patent application is a data processing application executed on a data processing installation on the management level.

A field device in the sense of the patent application is an industrial device on the field level that contributes to controlling the industrial process and comprises at least one sensor and/or one actuator.

Response data in the sense of the patent application are data from the field device that are transmitted by the field device in response to a data query. Response data may comprise sensor data or measured data from the field device and operating data by which the field device is characterized.

According to one embodiment, checking the data quality of the response data comprises: comparing the response data with a set of rules, wherein the set of rules defines quality requirements for response data from the field device, and wherein response data from the field device that deviate from the quality requirements defined in the set of rules are interpreted as response data of insufficient quality.

This makes it possible to achieve the technical advantage whereby it is possible to provide simple monitoring of the data quality of the response data from the field device. By comparing the response data with a set of rules and the quality requirements defined in the set of rules that should be expected for correct response data from the field device, it is possible to easily identify defective response data of insufficient quality by virtue of the fact that they deviate from the quality requirements defined in the set of rules.

Quality requirements hereinafter are properties that response data from a particular field device should have. Quality requirements may for example comprise predetermined data formats in which the response data from the field device should be structured. Quality requirements may furthermore define ranges of values for measured values from the field device. Quality requirements may be tailored individually to individual field devices and thus stipulate the data format in which the response data should be structured for the respective field device. The quality requirement may furthermore stipulate ranges of values for measured values from the field device within which the measured values of the response data should be contained.

If response data from a field device deviate from at least one feature of the quality requirements of the set of rules, the corresponding response data are classified as defective.

According to one embodiment, the response data comprise measured data from a sensor element of the field device, and the quality requirements for response data from the field device define data formats and/or ranges of values of the measured data.

This makes it possible to achieve the technical advantage whereby it is possible to provide simple and precise determination of the data quality of measured data from a field device. Measured data from a field device that have for example the wrong data format or are not contained within a range of values fixedly defined in the quality requirement may thus be classified as defective.

According to one embodiment, performing the corrective measure comprises:
  selecting a suitable corrective measure from a multiplicity of predefined corrective measures, wherein the multiplicity of corrective measures is linked to the set of rules for the field device, and wherein individually tailored corrective measures are defined for individually defined deviations of the response data from the quality requirements defined in the set of rules.

This makes it possible to achieve the technical advantage whereby it is possible to provide simple correction of defective response data. To this end, a multiplicity of different corrective measures are linked to the set of rules for the field device. A suitable corrective measure may thus be selected from the multiplicity of predefined corrective measures to correct the defective response data. The individual corrective measures are each linked to quality requirements of the set of rules. If response data deviate from a quality requirement predefined in the set of rules, the suitable corrective measure may thus be ascertained through the link to the respective quality requirement. Individually tailored corrective measures are thus provided for individually defined deviations of the response data from predefined quality requirements in the set of rules.

According to one embodiment, the set of rules and/or the corrective measures are individually tailored to the field device and/or a type of the field device and/or a type of response data.

This makes it possible to achieve the technical advantage whereby it is made possible to individually tailor the checking of the data quality of the response data to individual field devices. This makes it possible to achieve a precise identification of defective response data taking into consideration the respective field device or a type of the respective field device or a type of the respective response data. Different individually tailored assessment criteria of the data quality may thus be provided for different field devices or different data types of the response data. This makes it possible to achieve precise detection of defective data.

According to one embodiment, performing a corrective measure comprises:
  the data communication module transmitting a first error message to the field device and requesting new response data; and/or
  the data communication module transmitting a second error message to the management level application, wherein the second error message indicates failed data communication.

This makes it possible to achieve the technical advantage whereby it is possible to provide precise correction of defective response data. By transmitting an error message to the field device and requesting new response data, in response to which the field device transmits response data to the data module again, these thereafter again being checked by the checking module, it is possible to procure from the field device response data that meet the quality requirements, i.e., correspond to the quality requirements of the set of rules. In the case of faults in transferring the response data or in the case of transmission of incorrect response data by the field device, this may in particular constitute an effective corrective measure. In addition, or as an alternative, a defect in the data query of the data from the field device may be communicated by transmitting a further error message to the management level application, such that a new data query may be performed by the management level application.

According to one embodiment, performing a corrective measure comprises:
the checking module performing a data correction on the response data and generating corrected response data, wherein the corrected response data correspond to the quality requirements defined in the set of rules.

This makes it possible to achieve the technical advantage whereby it is possible to achieve precise and reliable correction of defective response data and to provide correct response data that correspond to the predefined quality requirements. It is possible for this purpose to make data corrections to the response data and for the checking module to generate corrected response data. The data corrections to be performed may in this case be defined in the appropriate corrective measures for a recognized deviation of the response data from the respectively predefined quality requirements of the set of rules. Such a predefined data correction may for example make provision to correct a defective measured value from the field device to a value predetermined in the respective corrective measure.

According to one embodiment, the method furthermore comprises:
the data communication module performing a data processing operation on the response data from the field device or the corrected response data from the field device and generating processed response data, wherein the data processing operation comprises a modification of a complexity and/or information content of the response data from the field device that corresponds to the data query from the management level application.

This makes it possible to achieve the technical advantage whereby the management level application is able to be provided with processed response data. A data processing operation may in this case comprise reducing the complexity of the response data. By way of example, an amount of data in the response data may be reduced in accordance with a predetermined reduction procedure. As an alternative or in addition, information content of the response data may be modified. By way of example, an appropriate average requested through a data query may be calculated based on the measured data from the field device. As an alternative thereto, any data processing operation may be performed on the response data.

The performance of the data processing operation on the response data may be performed during the runtime of the system. All of the response data from the field devices to appropriate data queries may accordingly be processed. As an alternative, only previously selected response data may be processed.

According to one embodiment, the method furthermore comprises:
the data communication module transferring the response data or the processed response data of sufficient data quality or the corrected response data to the management level application.

This makes it possible to achieve the technical advantage whereby it is possible to achieve provision of correct response data of a predetermined data quality to the management level application.

The response data may be transferred during the runtime of the system.

According to one embodiment, the method furthermore comprises:
a translation module of the data communication module translating the data query into a data format able to be interpreted by the field device; and/or
the translation module translating the response data into a data format able to be interpreted by the management level application.

This makes it possible to achieve the technical advantage whereby it is possible to achieve precise data communication between any field device on the field level and any management level application on the management level. This may be achieved through appropriate translation processes on the response data or the data query, thereby allowing communication between field devices and management level applications that each communicate in different languages or communication protocols.

According to one embodiment, the method furthermore comprises:
the data communication module comparing the data query from the management level application with a predefined data scheme of the response data from the field device; and/or
the data communication module comparing the response data from the field device with the predefined data scheme of the response data from the field device, wherein the data scheme for the field device defines what information from the field device is accessible through an appropriate data query; and
if the data query from the management level application or the response data from the field device does not correspond to the data scheme, the data communication module transmitting an error message to the management level application or the field device, wherein the error message indicates a defective data query.

This makes it possible to achieve the technical advantage whereby controlled data communication between management level applications and field devices of the industrial system is made possible. Using a data scheme that is able to be individually tailored to each field device, it is possible to restrict access to data or to information from the respective field device. Only data that are defined in the respective data scheme are thus able to be viewed through appropriate data queries from management level applications.

According to one embodiment, the data communication module is implemented on an external server, in particular a cloud server, or on an industrial edge device connected directly to the field device.

This makes it possible to achieve the technical advantage whereby the data processing operation or the data correction on the response data does not impair the functioning of the field device or the functioning of the management level application. Implementing the data communication module on an external server thus makes it possible to save on computing capacity of the field device and of the management level application. Implementing the data communication module on an external server furthermore makes it possible to implement the data communication module for a multiplicity of field devices. By applying the data communication module on an industrial edge device that is connected directly to an individual field device, it is possible to implement a data communication module individually for a particular field device. By connecting the industrial edge device directly to the respective field device, it is thus possible to reduce a distance to be covered for the data transfer of the response data between the field device and the data communication module to a minimum. This may be advantageous in particular in the case of large amounts of data in the response data to be transferred.

According to one embodiment, the data communication module implemented on the cloud server is able to be connected to a multiplicity of field devices, and the data communication module comprises individually tailored sets of rules and appropriate corrective measures for each connected field device, wherein the translation module is designed to translate data queries into data formats able to be interpreted by the multiplicity of field devices, and wherein the translation module is designed to translate response data into data formats able to be interpreted by multiple management level applications.

This makes it possible to achieve the technical advantage whereby it is possible to provide data communication between a multiplicity of field devices and possibly a multiplicity of different management level applications by implementing the data communication module on an appropriate cloud server. The data communication module may in this case be designed to check the response data, correct defective response data, process the response data or translate the response data or the data queries for the multiplicity of different field devices.

According to one embodiment, data communication may be performed between the management level application and the data communication module and/or between the field device and the data communication module via application programming interfaces.

This makes it possible to achieve the technical advantage whereby reliable data communication between the management level application and the data communication module or between the field device and the data communication module is made possible.

According to a second aspect of embodiments of the invention, a computer program product (non-transitory computer readable storage medium having instructions, which when executed by a processor, perform actions) comprising instructions that, when the program is executed by a computer, prompt the computer to perform the method according to one of the preceding aspects is provided.

The above-described properties, features and advantages of embodiments of the invention and the manner in which they are achieved will become more clearly and distinctly comprehensible by way of the explanations of the following highly simplified schematic illustrations of preferred exemplary embodiments.

BRIEF DESCRIPTION

Some of the embodiments will be described in detail, with references to the following Figures, wherein like designations denote like members, wherein.

DETAILED DESCRIPTION

Figure 1:
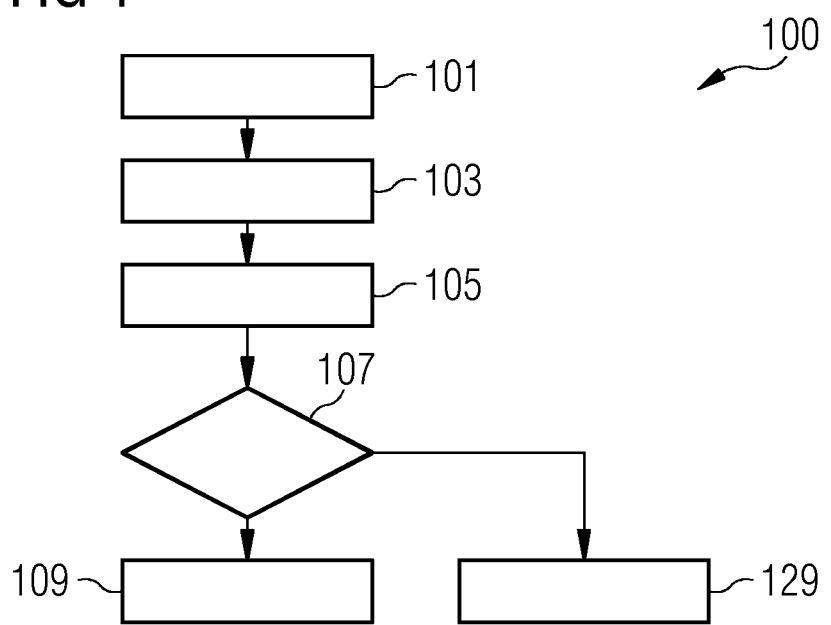
FIG. 1 shows a flowchart of a method for data communication between a management level and a field level in an industrial system according to one embodiment.

FIG. 1 shows a flowchart of a method 100 for data communication between a management level and a field level in an industrial system 200 according to one embodiment.

Figure 2:
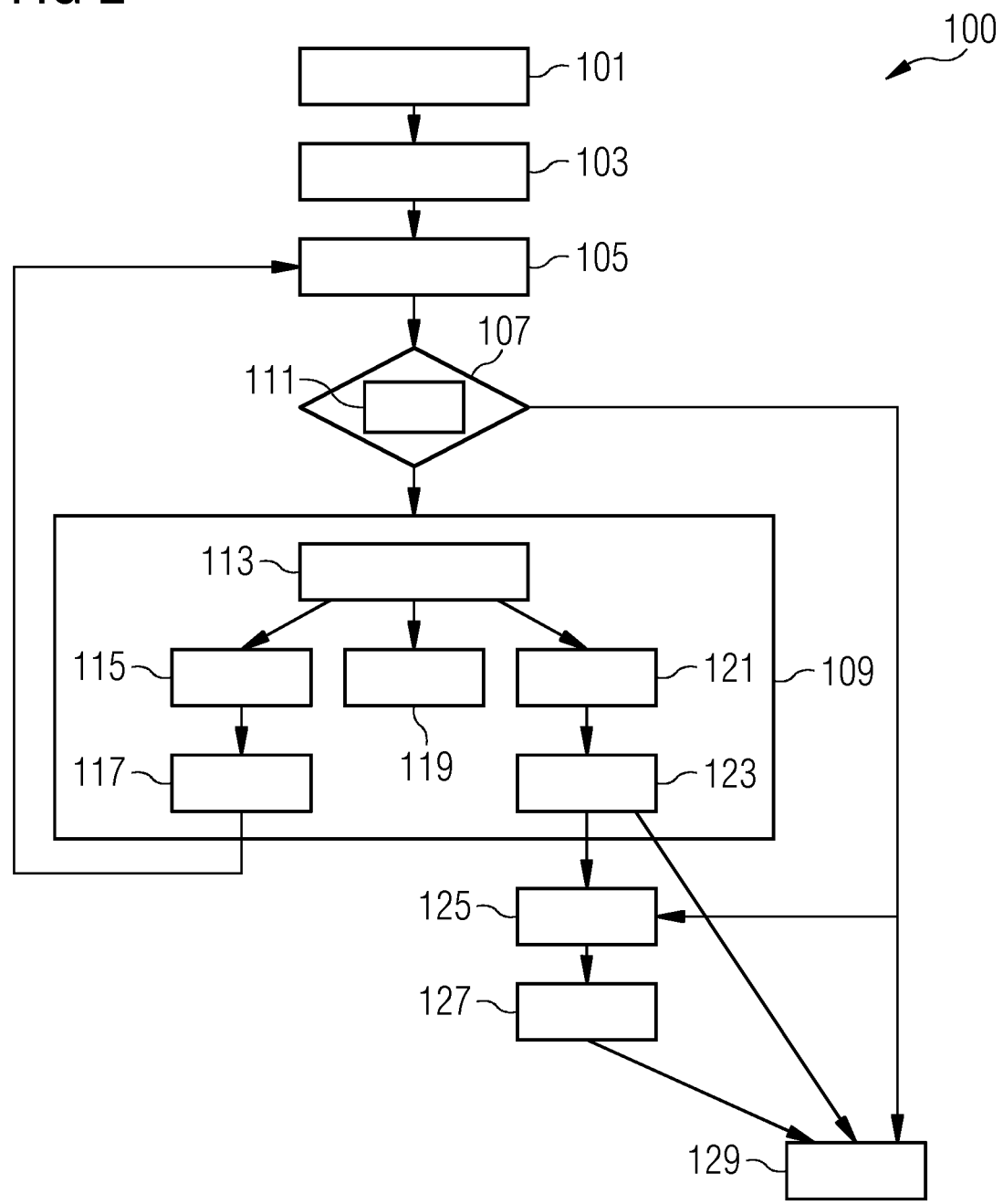
FIG. 2 shows a further flowchart of a method for data communication between a management level and a field level in an industrial system according to a further embodiment.
Figure 3:
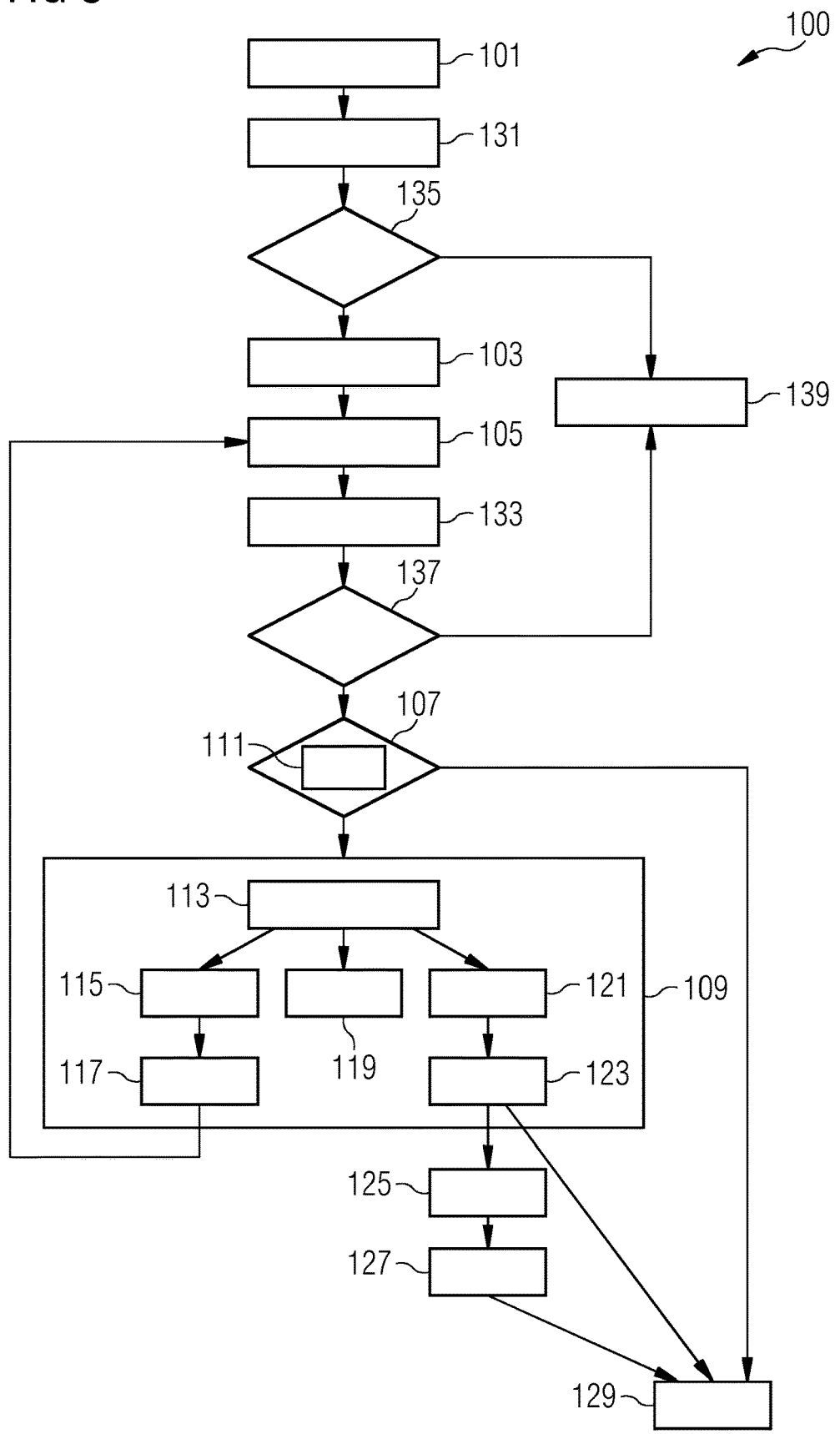
FIG. 3 shows a further flowchart of a method for data communication between a management level and a field level in an industrial system according to a further embodiment.
Figure 4:
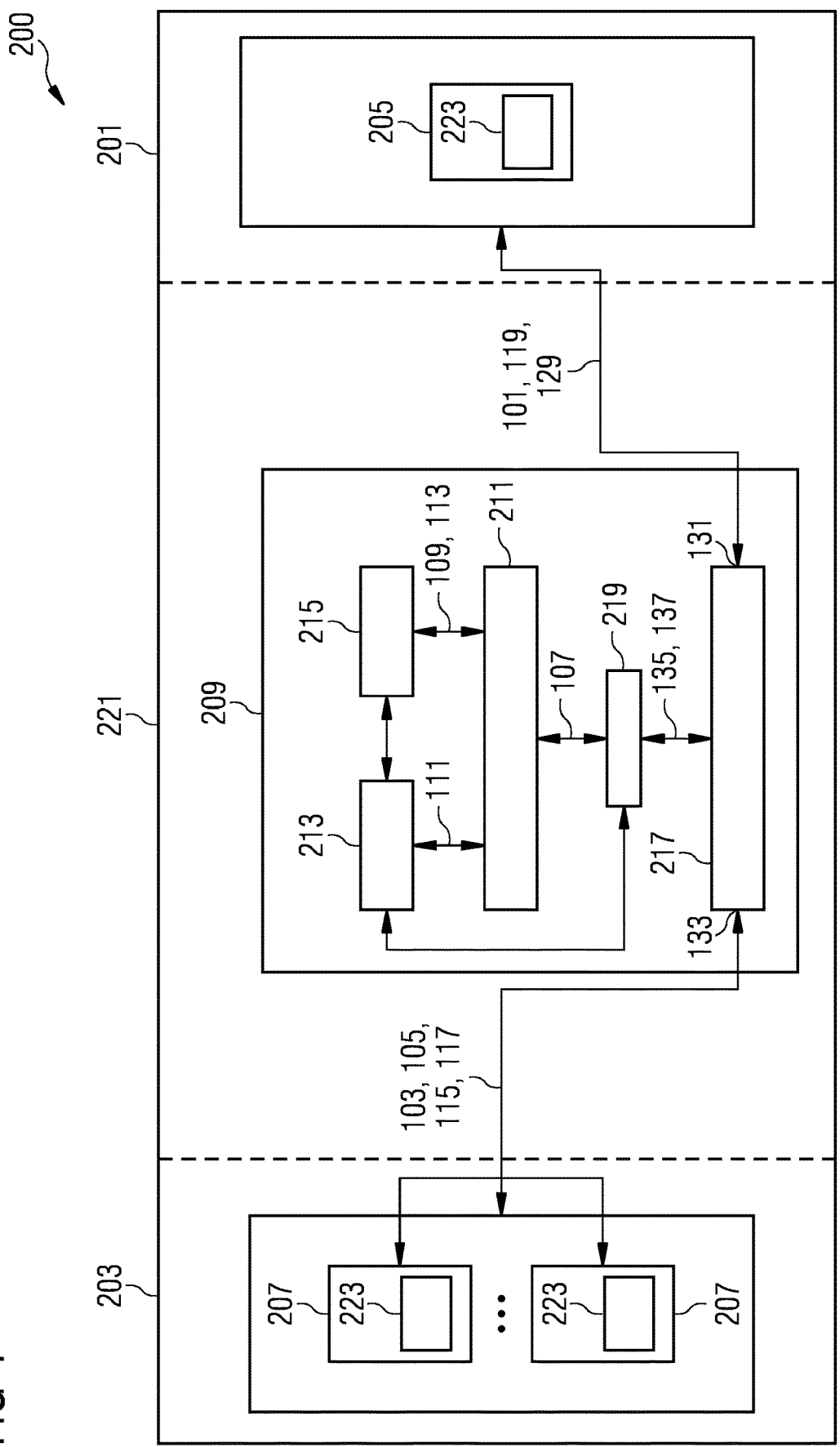
FIG. 4 shows a schematic illustration of an industrial system according to a further embodiment.

The description of the method 100 for data communication between a management level 201 and a field level 203 of an industrial system 200 with regard to FIGS. 1 to 3 is made with reference to FIG. 4.

The method 100 is able to be applied to an industrial system 200 according to the embodiment illustrated in FIG. 4.

An industrial system 200 in this case comprises at least a management level 201 having at least one management level application 205, a field level 203 having at least one field device 207 and a data communication module 209. The data communication module 209 is connected both to the management level application 205 on the management level 201 and to the field device 207 on the field level 203, such that data communication is able to take place between the management level application 205 and the data communication module 209 and between the field device 207 and the data communication module 209. Data communication may in this case take place via any communication protocols known from the conventional art.

An industrial system 200 may for example be formed by an automation system in which an automation process is able to be controlled and performed by actuating the field devices. An automation process or an industrial process may for example be a manufacturing process, a transport process or another type of mechanical process that is able to be controlled via sensors and actuators.

A field device 207 comprises at least one sensor and/or actuator that is designed to record measured data of a measured variable or to be actuated in accordance with appropriate control data.

A management level application 205 may be a data processing application that is executed on a data processing unit of the management level 201 and takes into consideration or processes data from the field device 207.

In a first method step 101, the data communication module 209 receives a data query from the management level application 205. A data query may in this case be a request message from the management level application 205 to the field device 207 in the form of a data query by way of which the field device 207 is requested to transmit corresponding response data.

In a further method step 103, the data communication module 209 transfers the data query from the management level application 205 to the respectively addressed field device 207.

Based on the data query, the field device 207 then provides corresponding response data. Response data from the field device 207 may comprise measured data or characteristic data from the respective field device 207. The response data from the field device 207 may be tailored to the respective data query, such that only the data requested in the data query are provided by the field device 207 in the form of the response data.

In a further method step 105, the data communication module 209 receives the response data from the field device 207.

The response data from the field device, in a further method step 107, are then checked in terms of data quality of the response data by the data communication module. The check on the data quality may take into consideration whether the response data from the field device correspond to the data requested in the data query, i.e., whether the field device 207 has transmitted the requested data. The check on the data quality may furthermore comprise detecting defective data that are defective due to transmission errors or malfunctions with the field device 207. The check on the data quality may furthermore comprise checking the actual values of the response data. In particular in the event that the response data comprise measured data from the field device 207, the check on the data quality may take into consideration whether the measured values are contained within a predetermined range of values. If the measured values of the response data from the field device 207 deviate from this predetermined range of values, the measured values may be recognized as defective during the check on the data quality.

If no defective data are ascertained in the check on the response data and the response data thus have a sufficient data quality, the response data from the field device 107, in a further method step 129, are transferred from the data communication module 209 to the respective management level application 205.

In a further method step 109, the checking module 211 then performs a corrective measure in order to correct the defective response data if an insufficient data quality and associated defective response data are ascertained in the check.

According to one embodiment, data communication is performed between the management level application 205 and the data communication module 209 via an application programming interface (API). Data communication between the field device 207 and the data communication module 209 may likewise be performed via an application programming interface (API).

According to one embodiment, the data communication module 209 may be implemented on a cloud server. To this end, the data communication module 209 may furthermore be designed to perform data communication with a multiplicity of different field devices 207 and/or a multiplicity of different management level applications 205. The data communication module 209 may furthermore be designed to use the checking module 211 to perform a check on the respective response data from the various field devices 207.

FIG. 2 shows a further flowchart of the method 100 for data communication between a management level 201 and a field level 203 in an industrial system 200 according to a further embodiment.

The embodiment of the method 100 in FIG. 2 is based on the embodiment of the method 100 in FIG. 1 and comprises all of the method steps described therein. If these remain unchanged in the following embodiment, another detailed description is eschewed.

According to the embodiment in FIG. 2, method step 107 comprises a method step 111 in which, in order to check the data quality of the response data from the field device 207, the response data received by the data communication module 209 are compared with predefined quality requirements, stored in a set of rules, for response data from the respective field device 207. Response data that do not meet the quality requirements of the set of rules 213 are then interpreted as response data of insufficient quality, i.e., as defective response data.

The quality requirements of the set of rules 213 may in this case be individually tailored to the respective field device 207 or the respective type of the field device 207 or to the type of the response data. The quality requirements may thus be defined individually for the respective field devices 207, such that both the type of the field device and the respective field of application of the field device 207 within the industrial system 200 may be taken into consideration in order to assess the data quality of the response data. A field of use for a temperature sensor may thus for example be taken into consideration in order to be able to assess whether the temperature data from the sensor are meaningful or defective. This may depend in particular on the respective field of use of the sensor.

The quality requirements may for example be used to define data formats of the response data, such that response data from the field device 207 that do not correspond to the defined data formats are identified as defective. As an alternative or in addition, the quality requirements of the set of rules 213 may be used to define ranges of values for measured values from the field device 207, such that response data or measured values that lie outside the defined range of values are evaluated as defective response data. In addition to ranges of values, the corresponding quality requirements may also stipulate individual values that for example have to be taken by particular measured values from the field device 207.

After comparison of the response data received by the data communication module 209 with the quality requirements of the set of rules 213, response data that do not meet the quality requirements of the set of rules 213 may be ascertained as defective response data of insufficient quality. Response data that meet the quality requirements of the set of rules 213 are by contrast classified as correct response data of sufficient quality.

In the embodiment in FIG. 2, method step 109 furthermore comprises a method step 113 in which the checking module 211 selects, from a multiplicity of predefined corrective measures, a suitable corrective measure for correcting the response data ascertained as defective in method step 107. The predefined corrective measures may in this case be linked to the set of rules 213 for the respective field device 207 such that suitable corrective measures are defined for the individual quality requirements defined in the set of rules 213 and in particular for deviations from these individually defined quality requirements. At least one corrective measure is thus defined for each quality requirement of the set of rules 213, this corrective measure being suitable for correcting a deviation of the response data from the respective quality requirement.

In the same way as for the quality requirements, the respective corrective measures may likewise be individually tailored to the respective field device 207, to a type of the field device or to a type of the respective response data. It is thus possible, for different field devices 207 of the industrial system 200, to define different and individually tailored quality requirements that the respective response data from the field device 207 have to meet for effective data communication. Individually appropriate corrective measures may furthermore be defined for each field device, such that provision may be made for different field devices of the industrial system.

The corrective measures may for example comprise transmitting an error message or correcting a defective value of the response data to a predefined value.

Depending on the respectively detected deviations of the response data from the predefined quality requirements detected by the checking module 211, in a following method step 115, the data communication module 209 may for example transmit an error message to the field device 207 and, in a method step 117, response data are requested from the field device 207 again.

The field device 207 may then accordingly transmit response data to the data communication module again, these being received by the data communication module 209 in method step 105. The response data transmitted again and received by the data communication module 209 may then be checked again by the checking module in method step 107. If these response data are identified as correct in checking step 107, the data communication module 209, in method step 129, may accordingly transmit the response data to the management level application 205. If defective response data are detected again, appropriate corrective measures may be performed again in method step 109.

As an alternative, to correct the defective response data, in a method step 119, the data communication module 209 may transmit a further error message to the management level application 205. This indicates defective data communication to the management level application. In response thereto, the management level application 205 may transmit a new data query to the field device 207 or the data communication module 209 and initiate new data communication.

As an alternative, to correct the defective response data, in a method step 121, the checking module 211 may make a data correction to the response data from the field device 207 and generate corrected response data in a further method step 123.

A data correction to the defective response data may make provision to correct defective values of the response data or values that are contained outside a predetermined range of values and deviate from a predetermined value to a predetermined replacement value, for example the numerical value 0. The response data corrected in method step 123 correspond logically to the quality requirements defined in the set of rules 213 and thus have a sufficient data quality.

The method 100 in the embodiment shown in FIG. 2 furthermore has a method step 125 in which the data communication module 209 performs a data processing operation both on the response data corrected in method step 123 and on the response data determined as correct in method step 107 and corresponding to the quality requirements. A data processing operation may for example comprise reducing the amount of data in the response data. As an alternative, it is possible to perform data processing processes that modify information content of the response data. By way of example, measured values of the response data may be combined to form an average. Any measured value evaluation methods known from the conventional art may furthermore be implemented.

In a following method step 127, corresponding processed response data are generated. The data processing operation or the processed response data generated on the basis thereof correspond to the response data from the field device 207 as requested in the data query from the management level application.

Depending on the data query from the management level application 205, the response data determined as correct in method step 107 or the corrected response data generated in method step 123 may be transferred firstly to the data processing operation in method step 125 and thus, in the form of generated processed response data, to the management level application 205 in method step 129. As an alternative, the corrected response data generated in method step 123 may be transferred to the management level application 205 without additional data processing in method step 129.

TABLE 1

| Set of rules ID | Quality requirement | Description |
|---|---|---|
| R1.1 | Value > 0 | Value must be positive |
| R1.2 | Value! = 0 | Value must not be negative |
| R1.3 | Value > 0 && value < 60 | Permissible value must be between 0 and 60 |
| R1.4 | Value > 60 | Value must not be greater than 60 |

Table 1 shows one example of a set of rules 213 and quality requirements, defined therein, for response data from a field device 207.

Table 1 defines four different quality requirements each having an assigned identification number R1.1 to R1.4. The first quality requirement R1.1 defines that a value of the response data must be greater than 0. The second quality requirement R1.2 defines that a value of the response data must not be negative. The third quality requirement R1.3 defines that a value of the response data must take a numerical value between 0 and 16. The fourth quality requirement R1.4 defines that a value of the response data must not be greater than 60. Table 1 furthermore comprises respective descriptions of the individual quality requirements.

The values of the response data described in table 1 may for example concern measured values from a sensor element of the field device 207. The quality requirements illustrated in table 1 are however merely exemplary and are not intended to describe a real application case. The values described in the quality requirements may describe the same value of the response data. As an alternative, the values defined in the quality requirements may describe different values of the response data.

TABLE 2

| Set of rules ID | Corrective measures ID | Deviation | Corrective measure | Description |
|---|---|---|---|---|
| R1.1 | M1.1 | Value > 0 | Output Value = 0 | If value is negative, set value to 0 |
| R1.2 | M1.2 | Value ! = 0 | Output "Value must not be equal to 0." | If value == 0, output "Value must not be equal to 0" |
| R1.3 | M1.3 | Value > 0 && Value < 60 | Output Value = zero | If value is greater than 150, value should be excluded from the list of results |
| R1.4 | M1.4 | Value > 60 | Output Error message | If value is greater than 60, output an error message |

Table 2 introduces appropriate corrective measures in addition to the quality requirements defined in table 1. Each quality requirement in table 1 in this case has an assigned appropriate corrective measure, such that, in the event of a deviation of the response data from the field device 207, a quality requirement defined in the set of rules is assigned to an individually tailored corrective measure.

If the response data deviate from quality requirement R1.1, i.e., in the event of a negative value, corrective measure M1.1 is thus performed, and the respective value is set to the numerical value 0. If the response data deviate from quality requirement R1.2, i.e., if a value of the response data takes the numerical value 0, corrective measure M1.2 is performed, and an error message is output that the respective value must not take the numerical value 0. If the response data deviate from quality requirement R1.3, i.e., in the event of a value of the response data that is not contained between 0 and 60, corrective measure M1.3 is performed, and the respective value is excluded from the list of results and set to zero. If the response data deviate from quality requirement R1.4, i.e., in the event of a value of the response data greater than 60, corrective measure M1.4 is performed, and an error message is likewise output.

The set of rules 213 may be in the form of a file, a database or a data repository. The checking module 211 is in this case designed to read in the file, the database or the data repository of the set of rules 213.

The quality requirements of the set of rules 213 and the corrective measures each have individual identifications (ID), giving an unambiguous assignment of a corrective measure to a particular quality requirement. A corrective measure to be performed is thus defined unambiguously for each deviation of the response data from a particular quality requirement of the set of rules 213, corresponding deviations being able to be corrected by the corrective measure. In addition to transmitting error messages or setting values of the response data to predetermined numerical values, corrective measures may comprise creating log entries.

The quality requirements and corrective measures illustrated in tables 1 and 2 are merely exemplary and are not intended to restrict embodiments of the present invention. On the contrary, tables 1 and 2 illustrate, by way of example, how it is possible, for response data from a field device 207, to predefine quality requirements and associated corrective measures on the basis of which it is possible to assess the data quality of the corresponding response data and to perform appropriate corrections to defective response data.

Depending on the design of the field device 207 or the respective application of the field device or the corresponding response data, provision may be made for different quality requirements and corrective measures.

FIG. 3 shows a further flowchart of the method for data communication between a management level and a field level in an industrial system 200 according to a further embodiment.

The embodiment of the method 100 in FIG. 3 is based on the embodiment in FIG. 2 and comprises all of the method steps described therein. Where these remain unchanged in the embodiment in FIG. 3, another detailed description is eschewed.

Unlike the embodiment in FIG. 2, the method 100 in the embodiment in FIG. 3 comprises a method step 131. In method step 131, a translation module 217 of the data communication module 209 translates the data query from the management level application 205 into a data format able to be interpreted by the field device 207.

The method 100 furthermore comprises a method step 133 in which the translation module 217 translates response data from the field device 207 into a data format able to be interpreted by the management level application 205.

The field devices 207 and the management level applications 205 may thus communicate in different communication protocols. The translation module 217 may accordingly translate the response data and the data queries, such that, in spite of different communication protocols, data communication between the management level applications 205 and the field devices 207 of the industrial system 200 is able to be guaranteed.

The method 100 furthermore comprises a method step 135. In method step 135, the data communication module 209 compares data queries from the management level application 205 with a predefined data scheme 219.

In a method step 137, the data communication module 209 likewise compares response data from the field device 207 with the predefined data scheme 219.

If the data queries from the management level application 205 and/or the corresponding response data from the field device 207 do not correspond to the predetermined data scheme, in a method step 139, error messages are transmitted to the management level application 205 or to the field device 207, indicating failed data communication.

A data scheme may be individually tailored to a respective field device 207 and define which data from the field device are able to be accessed by a management level application 205 with an appropriate data query in the form of a data query. The data scheme may furthermore define data formats for the response data that predetermine the format in which the information provided by the field device 207 should be transmitted thereby to the respective management level application 205. The data scheme may furthermore define communication instructions by way of which the management level application 205 is able to access data from the field device 207 by way of an appropriately configured data query.

According to one embodiment, the field device 207 and/or the management level application 205 comprises an appropriately configured application programming interface (API). The respective application programming interface (API) may be used to define the data scheme, thereby defining the information from the field device 207 accessible through an appropriate data query request from the management level application 205. The configuration of the application programming interface (API) may furthermore be used to define both the format of the data query and the format of the information respectively made available by the field device 207.

FIG. 4 shows a schematic illustration of an industrial system 200 according to a further embodiment.

FIG. 4 shows an embodiment of the industrial system 200 with a management level 201, a field level 203 and a data module 209. In the embodiment shown, the management level 201 comprises a management level application 205 that comprises a respective application programming interface (API) 223. The field level 203 has two field devices 207 that each likewise comprise an application programming interface (API) 223.

As an alternative to the embodiment shown here, the management level 201 may have any number of different management level applications 205. In addition, or as an alternative, the field level 203 may comprise any number of different field devices 207.

In the embodiment shown, the data communication module 209 is implemented on an external server 221, in particular a cloud server. As an alternative thereto, the data communication module may also be implemented on an industrial edge device that is connected directly to a field device 207.

The data communication module 209 comprises a checking module 211 for performing the check on the data quality of the response data from the field devices 207 and for performing the corrective measures for correcting defective response data in accordance with the method steps described above. The data communication module 209 furthermore comprises a set of rules 213 and a database 215 for corrective measures, containing, in accordance with what is described above, predefined quality requirements for the respective response data from the field devices 207 or appropriate corrective measures. In the embodiment shown, common sets of rules 213 or corrective measures stored in the database 215 are provided for the two illustrated field devices 207. As an alternative thereto, individually tailored sets of rules and the quality requirements defined therein, and also corrective measures tailored appropriately thereto may be provided for each individual field device 207.

The data communication module 209 furthermore comprises a translation module 217 for translating the data queries from the management level applications 205 and the response data from the field devices 207 in accordance with the translation procedures described above. The data communication module 209 furthermore has a data scheme 219 that defines data communication between the management level application 205 and the respective field devices 207.

For data communication, the management level application 205 first sends an appropriate data query to the data communication module 209. In accordance with method step 131, the translation module 217 translates the data query into a data format able to be interpreted by the field device 207. In accordance with method steps 135, 137, the data query is compared with the data scheme 219. If the data query matches the predetermined data scheme, the data query is transmitted from the data communication module 209 to the respectively addressed field device 207 in accordance with method step 103. In response thereto, the addressed field device 207 generates corresponding response data and transmits them to the data communication module 209, whereupon the data communication module 209 receives the transmitted response data in accordance with method step 105. In accordance with method step 133, the translation module 217 translates the received response data into a data format able to be interpreted by the management level application 205. In accordance with method steps 135, 137, the transmitted response data from the field device 207 are compared with the predefined data scheme. If the response data match the predefined data scheme 219, the checking module 211 checks the response data in accordance with method step 107. To this end, the checking module 211 compares the response data with the predefined quality requirements of the set of rules 213 in accordance with method step 111. If the response data from the field device 207 correspond to the quality requirements of the set of rules 213, they are transmitted from the data communication module 209 to the management level application 205 in accordance with method step 129. If the checking module 211 ascertains a deviation of the response data from the quality requirements of the set of rules 213, then a suitable corrective measure is selected from the database 215 of corrective measures in accordance with method steps 109, 113 and the appropriate corrective measure is performed in order to correct the defective response data. According to the embodiments described above, an appropriate error message may for this purpose be transmitted both to the field device 207 and to the management level application 205. As an alternative, appropriate data corrections may be performed in accordance with method step 121 and corrected response data may be generated in accordance with method step 123. These may then be transmitted by the data communication module 209 to the management level application 205 in accordance with method step 129. In a manner not illustrated in the embodiment of FIG. 4, the data communication module 209, as described above, may additionally perform a data processing operation on the response data and generate processed response data in accordance with method steps 125, 127, these likewise being transmitted to the management level application 205 in accordance with method step 129.

According to one embodiment, the data communication module may be configured in accordance with the open-source data query and GraphQL manipulation language. The application programming interfaces (API) may in this case likewise be configured in accordance with the data query and GraphQL manipulation language.

The set of rules 213 may be in the form of a file, a database or a data repository. The checking module 211 is in this case designed to read in the file, the database or the data repository of the set of rules 213.

Figure 5:
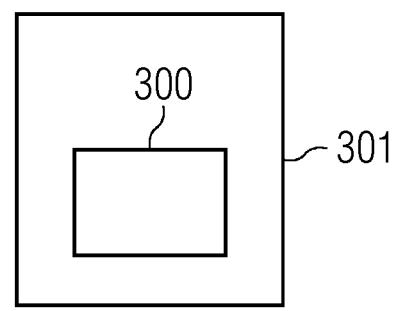
FIG. 5 shows a schematic illustration of a computer program product according to an embodiment.

FIG. 5 shows a schematic illustration of a computer program product.

The computer program product 300 is contained on a storage medium 301. The storage medium 301 may for example be a hard drive of a data processing installation, an external hard drive or another storage medium known from the conventional art.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for data communication between a management level and a field level of an industrial system, the management level controlling processes of the industrial system, comprising:

providing a data communication module, the data communication module connected to both a management level application on the management level and a field device on the field level such that data communication takes place between the management level application and the data communication module and between the field device and the data communication module;

receiving, by the data communication module, a data query from the management level application on the management level to the field device on the field level;

transferring, by the data communication module, the data query from the management level application to the field device;

receiving, by the data communication module, response data from the field device to the data query;

checking, by a checking module of the data communication module, a data quality of the response data, wherein checking the data quality includes considering whether the response data corresponds to the data query and/or whether the response data is in a predetermined data format in which the response data should be structured;

performing, by the checking module, a corrective measure in order to correct the response data when an insufficient data quality is ascertained in the checking; and transferring, by the data communication module, the response data or the corrected response data to the management level application for use in controlling processes of the industrial system;

wherein checking by the checking module of the data communication module occurs prior to transferring by the data communication module the response data or the corrected response data to the management level application, and wherein the checking the data quality of the response data further comprises comparing, by the checking module, the response data with a set of rules, wherein the set of rules define individually tailored quality requirements for response data from respective field devices, and wherein response data from the respective field devices that deviate from the individually tailored quality requirements defined in the set of rules are interpreted as response data of insufficient quality.

2. The method as claimed in claim 1, wherein checking the data quality of the response data includes investigating a predetermined percentage of transmitted data queries and/or response data, and/or wherein checking the data quality of the response data is performed only during breaks in operation of the industrial system.

3. The method as claimed in claim 1, wherein the response data comprise measured data from a sensor element of the field device, and wherein the quality requirements for response data from the field device define the predetermined data format and/or ranges of values of the measured data.

4. The method as claimed in claim 1, wherein performing the corrective measure comprises:

selecting, by the checking module, a suitable corrective measure from a multiplicity of predefined corrective measures, wherein the multiplicity of corrective measures is linked to the set of rules for the field device, and wherein individually tailored corrective measures are defined for individually defined deviations of the response data from the quality requirements defined in the set of rules.

5. The method as claimed in claim 4, wherein the set of rules and/or the corrective measures are individually tailored to the field device and/or a type of the field device and/or a type of response data.

6. The method as claimed in claim 1, wherein performing a corrective measure comprises:

transmitting, by the data communication module, a first error message to the field device and requesting new response data; and/or transmitting, by the data communication module, a second error message to the management level application, wherein the second error message indicates failed data communication, receiving, by the data communication module, a new data query from the management level application on the management level to the field device on the field level, and transferring, by the data communication module, the new data query from the management level application to the field device.

7. The method as claimed in claim 2, wherein performing a corrective measure comprises:

performing, by the checking module, a data correction on the response data and generating corrected response data, wherein the corrected response data correspond to the quality requirements defined in the set of rules.

8. The method as claimed in claim 1, furthermore comprising:

performing, by the data communication module, a data processing operation on the response data from the field device or the corrected response data from the field device and generating processed response data, wherein the data processing operation comprises a modification of a complexity and/or information content of the response data from the field device that corresponds to the data query from the management level application.

9. The method as claimed in claim 8, furthermore comprising:

transferring, by the data communication module, the processed response data of sufficient data quality to the management level application.

10. The method as claimed in claim 1, furthermore comprising:

translating, by a translation module of the data communication module, the data query into a data format able to be interpreted by the field device; and/or translating, by the translation module, the response data into a data format able to be interpreted by the management level application.

11. The method as claimed in claim 1, furthermore comprising:

comparing, by the data communication module, the data query from the management level application with a predefined data scheme of the response data from the field device; and/or comparing, by the data communication module, the response data from the field device with the predefined data scheme of the response data from the field device, wherein the data scheme for the field device defines what information from the field device is accessible through an appropriate data query; and if the data query from the management level application or the response data from the field device does not correspond to the data scheme, transmitting, by the data communication module, an error message to the management level application or the field device, wherein the error message indicates a defective data query.

12. The method as claimed in claim 1, wherein the data communication module may be implemented on an external server or on an industrial edge device connected directly to the field device.

13. The method as claimed in claim 12, wherein the data communication module is implemented on a cloud server and is able to be connected to a multiplicity of field devices, and wherein the data communication module comprises individually tailored sets of rules and appropriate corrective measures for each connected field device, wherein the translation module is designed to translate data queries into data formats able to be interpreted by the multiplicity of field devices, and wherein the translation module is designed to translate response data into data formats able to be interpreted by multiple management level applications.

14. The method as claimed in claim 1, wherein data communication is able to be performed between the management level application and the data communication module and/or between the field device and the data communication module via application programming interfaces.

15. A computer program product, comprising a computer readable hardware storage device having computer readable program code stored therein, said program code executable by a processor of a computer system to implement the method as claimed in claim 1.

16. A method for data communication between a management level and a field level of an industrial system, the management level controlling processes of the industrial system, comprising:

receiving a data query from a management level application on the management level to a field device on the field level;

transferring the data query from the management level application to the field device;
receiving response data from the field device to the data query;
checking a data quality of the response data, wherein checking the data quality includes considering whether the response data corresponds to the data query and/or whether the response data is in a predetermined data format in which the response data should be structured;
when an insufficient data quality is ascertained in the checking, performing a corrective measure in order to correct the response data; and
transferring the response data or corrected response data to the management level application for use in controlling processes of the industrial system;
wherein checking the data quality of the response data occurs prior to transferring the response data or the corrected response data to the management level application, and
wherein the checking the data quality of the response data further comprises comparing the response data with a set of rules, wherein the set of rules defines individually tailored quality requirements for response data from respective field devices, and wherein response data from the respective field devices that deviate from the individually tailored quality requirements defined in the set of rules are interpreted as response data of insufficient quality.

17. The method as claimed in claim 16, comprising:
performing a data processing operation on the response data from the field device or the corrected response data from the field device and generating processed response data, wherein the data processing operation comprises a modification of a complexity and/or information content of the response data from the field device that corresponds to the data query from the management level application.

18. The method as claimed in claim 16, wherein performing the corrective measure includes transmitting an error message to the field device and requesting new response data.

19. The method as claimed in claim 16, wherein performing the corrective measure includes transmitting an error message to the management level application, wherein the second error message indicates failed data communication, receiving, a new data query from the management level application on the management level to the field device on the field level, and transferring the new data query from the management level application to the field device.

20. A method for data communication between a management level and a field level of an industrial system, the management level controlling processes of the industrial system, comprising:
providing a data communication module, the data communication module connected to both a management level application on the management level and a field device on the field level such that data communication takes place between the management level application and the data communication module and between the field device and the data communication module;
receiving, by the data communication module, a data query from the management level application on the management level to the field device on the field level;
transferring, by the data communication module, the data query from the management level application to the field device;
receiving, by the data communication module, response data from the field device to the data query;
checking, by a checking module of the data communication module, a data quality of the response data, wherein checking the data quality includes considering whether the response data corresponds to the data query and/or whether the response data is in a predetermined data format in which the response data should be structured;
performing, by the checking module, a corrective measure in order to correct the response data when an insufficient data quality is ascertained in the checking; and
transferring, by the data communication module, the response data or the corrected response data to the management level application for use in controlling processes of the industrial system;
wherein checking by the checking module of the data communication module occurs prior to transferring by the data communication module the response data or the corrected response data to the management level application,
wherein the method further comprises:
comparing, by the data communication module, the data query from the management level application with a predefined data scheme of the response data from the field device; and/or
comparing, by the data communication module, the response data from the field device with the predefined data scheme of the response data from the field device, wherein the data scheme for the field device defines what information from the field device is accessible through an appropriate data query; and
when the data query from the management level application or the response data from the field device does not correspond to the data scheme, transmitting, by the data communication module, an error message to the management level application or the field device, wherein the error message indicates a defective data query.

* * * * *